United States Patent [19]

Kump et al.

[11] Patent Number: 4,632,888
[45] Date of Patent: Dec. 30, 1986

[54] BATTERY CARRYING HANDLE

[75] Inventors: William H. Kump, Mendota Heights; Joseph J. Jergl, Minneapolis, both of Minn.

[73] Assignee: GNB Incorporated, Mendota Heights, Minn.

[21] Appl. No.: 770,944

[22] Filed: Aug. 30, 1985

[51] Int. Cl.[4] ............................................. H01M 2/10
[52] U.S. Cl. ........................... 429/187; 16/DIG. 15; 220/94 R; 224/902; 294/903
[58] Field of Search ................. 429/187; 16/DIG. 15; 220/94 R, 96; 224/902; 294/158, 167, 168, 903

[56] References Cited

U.S. PATENT DOCUMENTS 3,797,876  3/1974  Gummelt ............................ 429/187
4,013,819  3/1977  Grabb .................................. 429/187

FOREIGN PATENT DOCUMENTS 0627030  11/1934  Fed. Rep. of Germany ...... 429/187
1290147   9/1972  United Kingdom ................ 429/187
2087134   5/1982  United Kingdom ................ 429/187

Primary Examiner—Donald L. Walton
Attorney, Agent, or Firm—Augustus J. Hipp; Keith B. Willhelm

[57] ABSTRACT

An assembly for a recessible carrying handle is provided for a battery having a container and cover. The assembly comprises: an elongated recess in the top surface of the cover; an elongated recess in opposing side wall surfaces of the cover, which cover side recesses communicate with the ends of the cover top recess; an elongated recess in opposing side wall surfaces of the container, which container side recesses communicate with the cover side recesses; a pair of tongues projecting from the side walls of and into each container side recess; a generally U-shaped handle having two limbs connected by a cross piece; a pair of grooves in the sides of each handle limb, which grooves are adapted to slidably receive the tongues; and a pair of slots in the grooves, which slots are adapted to allow passage of the tongues in and out of the grooves;

whereby the handle may be attached readily and without significant distortion to an otherwise completely assembled battery and upon attachment is slidably received in the recesses.

14 Claims, 4 Drawing Figures

BATTERY CARRYING HANDLE

TECHNICAL FIELD

The present invention relates to battery carrying handles and more particularly to a recessible battery carrying handle.

BACKGROUND OF THE INVENTION

Both the provision and advantages of battery carrying handles are well known, especially of bail-type handles. Bail handles typically comprise a U- or C-shaped member attached to opposing sides of the battery, either on its container or cover, by which the battery may be carried in much the same fashion as a picnic basket or pail. Frequently, however, bail handles tend to interfere with one or more of the many types of devices by which batteries are mounted in vehicles, and therefore make it difficult to design a battery which is suitable for use with all types of mounting devices.

Bail handles, therefore, have been designed which can be detached and removed from the battery after installation. Examples of detachable bail handles are disclosed, e.g., in U.S. Pat. No. 4,029,248 to F. Lee; U.S. Pat. No. 3,956,022 to A. Fox; and U.S. Pat. No. 3,093,515 to R. Rector. While it is claimed that detachable bail handles offer certain other advantages, they are not entirely successful in permitting the battery to be adaptable to all mounting devices. The means for detachably connecting the ends of the bail handle to the battery typically comprises members which project from the overall geometry of the battery, even when the handle is detached, and interfere with some mounting devices. Moreover, detachable handles present the problem of being lost or mislaid after installation of the battery so that they are not available for use carrying the battery at a later date.

It also is known to provide recesses in the battery cover and/or container and to slidably mount a bail handle such that it fits into the recesses when not in use. Examples of such recessible designs are disclosed, e.g., in U.S. Pat. No. 4,448,863 to C. Terrell and U.S. Pat. No. 4,424,264 to M. McGuire et al. Typically, however, the design of such recessible handles is complicated and/or does not allow for easy manufacture or assembly of the handle. For example, thermoplastic polymers are the materials of choice for battery containers and handles, but many handle designs require complicated molds and are expensive and difficult to mold. Some handles must be attached simultaneously with the sealing of the battery cover to the container, and accordingly, the assembly of the battery is unnecessarily complicated. Other handles must be distorted considerably to attach them. Thus, they are somewhat difficult to attach and must be made of highly resilient material not entirely suitable for supporting the weight of the battery without a real possibility of detaching. Recessed handles also tend to be difficult to grasp and/or awkward and uncomfortable to use.

An object of this invention, therefore, is to provide a bail type battery handle which is simply, easily, and economically manufactured and strong and reliable in use, yet which is slidably received in corresponding recesses and which may be attached easily and without significant distortion after assembly of the otherwise completed battery.

It also is an object to provide a recessible handle which cannot be easily disassembled from the battery and lost.

It is a further object of this invention to provide a handle which is grasped easily and comfortably during use.

These and other objects and advantages of the invention will be apparent to those skilled in the art upon reading the following detailed description and upon reference to the drawings.

SUMMARY OF THE INVENTION

This invention provides an assembly for a recessible carrying handle for a battery having a container and cover, wherein the assembly comprises:
  (a) an elongated recess in the top surface of said cover;
  (b) elongated recesses in opposing side wall surfaces of said cover, which cover side recesses communicate with the ends of said cover top recess;
  (c) elongated recesses in opposing side wall surfaces of said container, which container side recesses communicate with said cover side recesses;
  (d) a pair of tongues projecting from the side walls of and into each said container side recess;
  (e) a generally U-shaped handle having two limbs connected by a cross piece;
  (f) a pair of grooves in the sides of each said handle limb, which grooves are adapted to slidably receive said tongues; and
  (g) a pair of slots in said grooves, which slots are adapted to allow passage of said tongues in and out of said grooves;
whereby said handle may be attached readily and without significant distortion to an otherwise completely assembled battery and, upon attachment, is slidably received in said recesses.

DETAILED DESCRIPTION OF THE INVENTION

Figure 1:
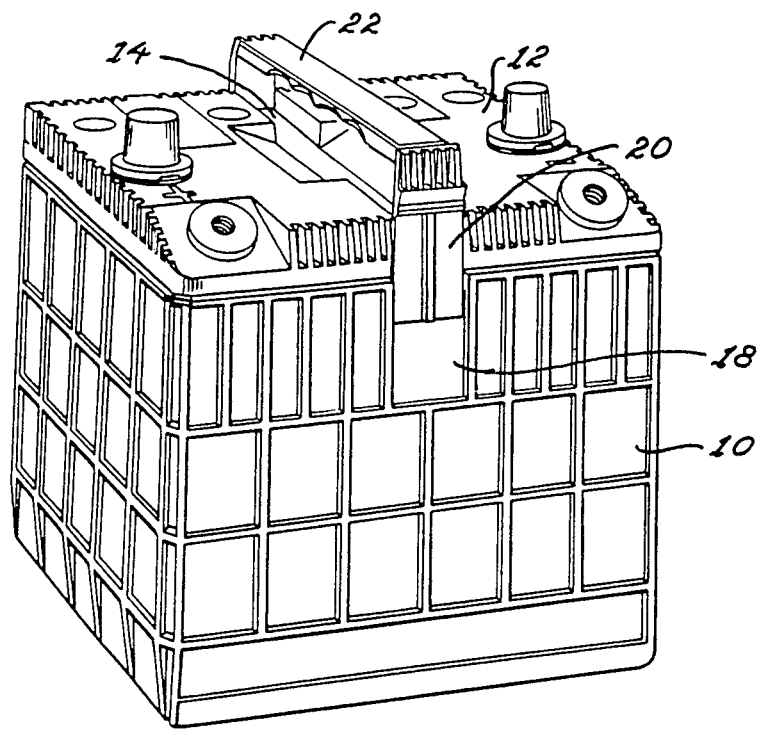
FIGS. 1 and 1A are perspective views of a battery having a handle assembly of the present invention showing, respectively, the handle in its extreme raised and extreme lowered positions.
Figure 1A:
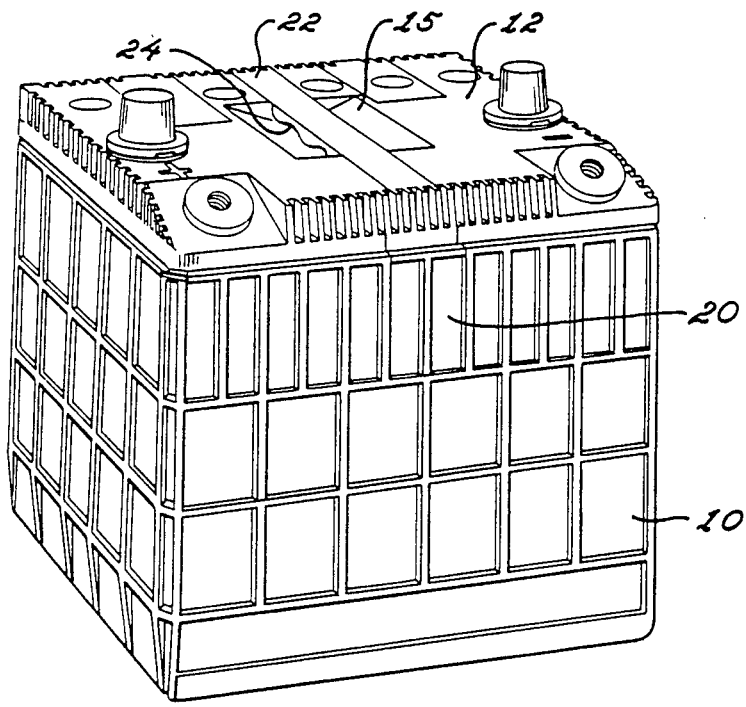
Figure 2:
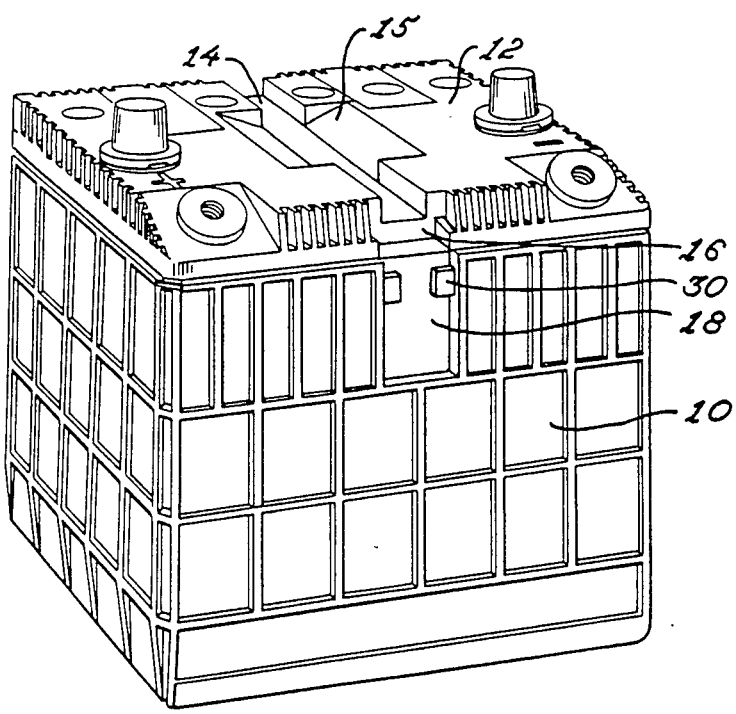
FIG. 2 is a perspective view of the battery shown in FIG. 1 with the handle removed showing certain details of the tongue and groove joints.
Figure 3:
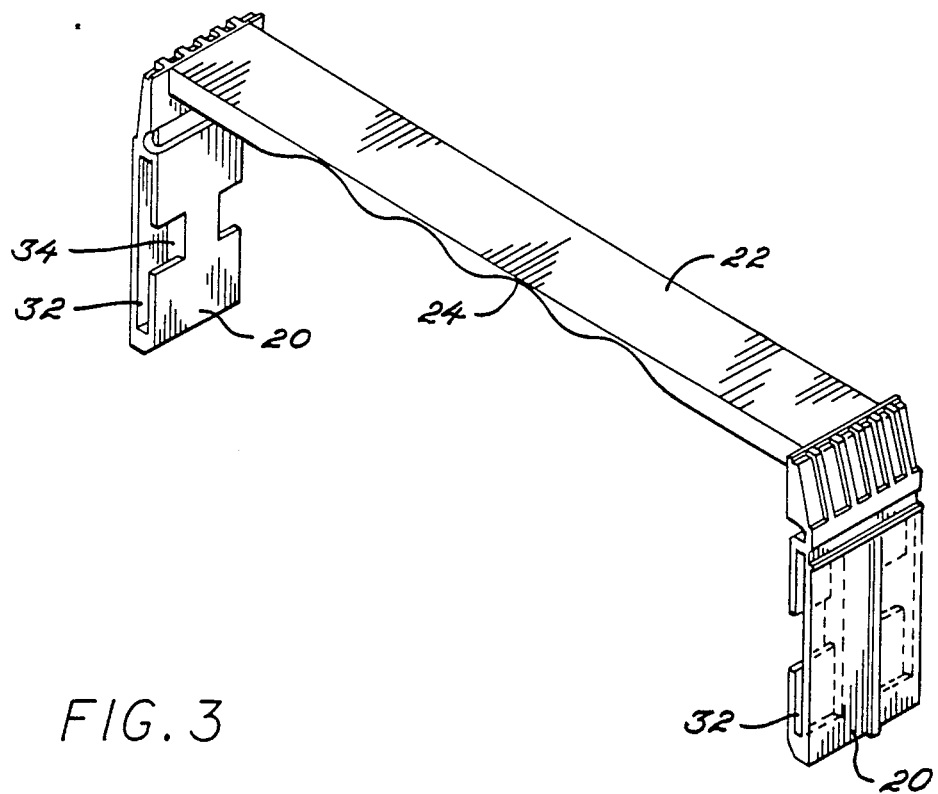
FIG. 3 is a perspective view of the handle shown in FIG. 1 showing further details of the tongue and groove joints.

As shown in FIGS. 1-3, a battery having the handle assembly of the subject invention comprises a generally right rectangular shaped container 10 and a corresponding cover 12. The illustrated battery is particularly suited for automobiles, but the handle assembly may be used with other types of batteries, or for that matter in conjunction with other container and cover combinations where it is necessary or desirable to incorporate a handle having the advantages disclosed herein.

The cover 12 is provided with an elongated recess 14 extending transversely along its centerline and across its top surface. The cover 12 also has elongated recesses 16 in two of its opposing side wall surfaces which communicate with the end portions of the cover top recess 14. The container 10 has elongated recesses 18 in two of its opposing side wall surfaces which in turn communicate with the cover side recesses 16.

The handle is generally U-shaped having two limbs 20 connected by a crosspiece 22. It is slidably received in the recesses 14, 16, and 18, such that it may slide between an extreme lowered position in which the upper surface of the cross piece 22 is flush with the upper surface of the cover 12, in which position the handle will remain when not in use, and a raised position in which it stands away from the cover 12 to facilitate grasping to carry the battery.

In accordance with the present invention, the handle is slidably mounted by tongue and groove joints comprising a pair of tongues 30 projecting from the side walls of and into the container side recesses 18 and a pair of grooves 32 in the sides of the handle limbs 20. The size of the tongues 30 and their orientation relative to the grooves 32 should be such that they not only are slidably received therein, but that they are capable of supporting the weight of the battery and of uniformly transferring the stress therefrom to the battery handle. As and alternative embodiment, the pair of tongues 30 may project from the side walls of and into the cover side recess 16 when the cover has a skirt portion of such dimensions to permit such construction.

As another feature of the subject handle assembly, the grooves 32 in the handle limbs 20 are provided with a pair of slots 34 which are adapted to allow passage of the tongues 30 in and out of the grooves 32, and thereby make it possible to attach the handle easily to an otherwise completely assembled battery without significant distortion to the handle. Moreover, by positioning the slots 34 and tongues 30 in the mid-regions, respectively, of the grooves 32 and container side recesses 18, the handle can be attached to the battery only in a position between its extreme lowered position and its extreme raised position. Thus, in this preferred embodiment, the handle, once attached, is not readily detached because the handle normally would be in one of those extreme positions, and in such positions, the tongues 30 are distant from and unaligned with the slots 34.

Further in accordance with this preferred embodiment of the present invention, the cover top recess 14 is provided in its mid-regions with flared portions 15 which allow the handle to be grasped easily by its cross piece 22. The cross piece 22 also is provided with a series of smoothed notches 24 in each of its lower edges so that the handle may be held comfortably during use.

It also will be appreciated that the tongue and groove joints of the subject handle assembly may be easily made as well. For example, when the container 10, cover 12, and handle are composed of a thermoplastic polymer, such as polypropylene, those pieces can be made by conventional injection molding techniques employing molds which can be opened by single action, as opposed to double action. That is, upon completion of the molding process, the mold may be separated from the molded piece by moving each of the mold's component parts in a single direction instead of two or more directions, e.g., by moving a mold part down, instead of down and out before it can be freed from the molded piece. The components of the handle assembly of the subject invention, therefore, may be adapted more easily to automated molding processes, require less expensive and complicated molds, and because of the relative simplicity of the mold and molding process, may be manufactured more reliably and with fewer rejected, unacceptable products.

While this invention has been disclosed and discussed primarily in terms of specific embodiments thereof, it is not intended to be limited thereto. Other modifications and embodiments will be apparent to the worker in the art.

We claim:
1. An assembly for a recessible carrying handle for a battery wherein said assembly comprises:
 (a) an elongated recess in said cover top surface;
 (b) elongated recesses in opposing side wall surfaces, which side recesses communicate with the ends of said cover top recess;
 (c) a pair of tongues projecting from the side walls of and into each said side recess;
 (d) a generally U-shaped handle having two limbs connected by a cross piece;
 (e) a pair of grooves in the sides of each said handle limb, which grooves are adapted to slidably receive said tongues; and
 (f) a pair of slots in said grooves, which slots are adapted to allow passage of said tongues in and out of said grooves.

2. The battery handle assembly of claim 1, wherein said side recesses comprise (i):
 elongated cover recesses in opposing side wall surfaces of said cover, which cover side recesses communicate with the ends of said cover top recess, and (ii)
 elongated recesses in opposing side wall surfaces of said container, which container side recesses communicate with said cover side recesses; and wherein said
 tongues project from the side walls of and into each said container side recess.

3. The carrying handle assembly of claim 2, wherein said tongues and said slots are disposed along the mid-regions of, respectively, said container side recesses and said grooves.

4. The carrying handle assembly of claim 2, wherein said container, cover, and handle are composed of a thermoplastic polymer.

5. The battery handle assembly of claim 1, has a depending skirt portion, wherein said side recesses comprise:
 elongated recesses in opposing skirt portion surfaces of said cover, which skirt recesses communicate with the ends of said cover top recess, and wherein said
 tongues project from the side walls of and into each said skirt recess.

6. The carrying handle assembly of claim 5, wherein said tongues and said slots are disposed along the mid-regions of, respectively, said skirt recesses and said grooves.

7. The carrying handle assembly of claim 5, wherein said container, cover, and handle are composed of a thermoplastic polymer.

8. An electric storage battery comprising:
 (a) a container and a cover, which cover defines a top surface and which container and cover define when sealed together side wall surfaces;
 (b) an elongated recess in said cover top surface;
 (c) elongated recesses in opposing side wall surfaces, which side recesses communicate with the ends of said cover top recess;
 (d) a pair of tongues projecting from the side walls of and into each said side recess;

(e) a generally U-shaped handle having two limbs connected by a cross piece;

(f) a pair of grooves in the sides of each said handle limb, which grooves are adapted to slidably receive said tongues; and (g) a pair of slots in said grooves, which slots are adapted to allow passage of said tongues in and out of said grooves.

9. The electric storage battery of claim 8, wherein said side recesses comprise (i)

elongated recesses in opposing side wall surfaces of said cover, which cover side recesses communicate with the ends of said cover top recess, and (ii)

elongated recesses in opposing side wall surfaces of said container, which container side recesses communicate with said cover side recesses; and wherein said tongues project from the side walls of and into each said container side recess.

10. The battery of claim 9, wherein said tongues and said slots are disposed along the mid-regions of, respectively, said container side recesses and said grooves.

11. The battery of claim 9, wherein said container, cover, and handle are composed of a thermoplastic polymer.

12. The electric storage battery of claim 8, wherein said cover has a depending skirt portion, wherein said side recesses comprise elongated recesses in opposing skirt portion surfaces of said cover, which skirt recesses communicate with the ends of said cover top recess, and wherein said tongues project from the side walls of and into each said skirt recess.

13. The battery of claim 12, wherein said tongues and said slots are disposed along the mid-regions of, respectively, said skirt recesses and said grooves.

14. The battery of claim 12, wherein said container, cover, and handle are composed of a thermoplastic polymer.

* * * * *

UNITED STATES PATENT AND TRADEMARK OFFICE
CERTIFICATE OF CORRECTION

PATENT NO. : 4,632,888

DATED : December 30, 1986

INVENTOR(S) : William H. Kump and Joseph J. Jergl

It is certified that error appears in the above-identified patent and that said Letters Patent is hereby corrected as shown below:

In claim 1, at col. 4, line 8, after "battery" insert -- having a container and a cover, which cover defines a top surface and which container and cover define when sealed together side wall surfaces, --.

In claim 5, at col. 4, line 43, after "claim 1," insert -- wherein said cover --.

Signed and Sealed this

Second Day of February, 1993

Attest:

STEPHEN G. KUNIN

Attesting Officer

Acting Commissioner of Patents and Trademarks